US008589067B2

(12) United States Patent  
Asakawa et al.

(10) Patent No.: US 8,589,067 B2
(45) Date of Patent: Nov. 19, 2013

(54) METHOD, DEVICE AND COMPUTER PROGRAM FOR MAPPING MOVING DIRECTION BY SOUNDS

(75) Inventors: Chieko Asakawa, Kanagawa-ken (JP); Susumu Harada, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 13/303,366

(22) Filed: Nov. 23, 2011

(65) Prior Publication Data

US 2012/0136569 A1 May 31, 2012

(30) Foreign Application Priority Data

Nov. 30, 2010 (JP) ................................. 2010-265981

(51) Int. Cl.
*G01C 21/36* (2006.01)
*H04N 13/02* (2006.01)
*G09B 21/00* (2006.01)
*G06K 9/00* (2006.01)
*G01S 15/00* (2006.01)

(52) U.S. Cl.
USPC ............. 701/431; 348/46; 434/112; 434/116; 367/116

(58) Field of Classification Search
USPC ............. 701/431; 348/46; 135/911; 434/112, 434/116; 367/116
See application file for complete search history.

(56) References Cited

U.S. PATENT DOCUMENTS

| 5,806,017 | A |  | 9/1998 | Hancock |
| 6,320,496 | B1 | * | 11/2001 | Sokoler et al. ............. 340/407.1 |
| 6,671,226 | B1 | * | 12/2003 | Finkel et al. .................. 367/116 |
| 7,039,522 | B2 |  | 5/2006 | Landau |

(Continued)

FOREIGN PATENT DOCUMENTS

| CN | 101385677 | 3/2009 |
| JP | 2001-004396 | 12/2001 |
| JP | 2003-067885 | 7/2003 |
| JP | 2005-215739 | 11/2005 |

OTHER PUBLICATIONS

G. Balakrishnan et al., "Wearable Real-Time Stereo Vision for the Visually Impaired", Engineering Letters, 14:2, EL_14_2_2 (Advance online publication: May 16, 2007).

(Continued)

*Primary Examiner* — Thomas Black
*Assistant Examiner* — Tyler Paige
(74) *Attorney, Agent, or Firm* — Jennifer R. Davis; Anne Vachon Dougherty; Eustus D. Nelson

(57) ABSTRACT

A method and apparatus for mapping a moving direction by using sounds for people with visual impairments, in which a moving direction can be expressed multi-dimensionally by using sound information and can effectively assist people with visual impairments and the like in navigation tasks. A moving direction of a person carrying a device configured to output sounds is mapped by using a combination of sounds outputted from the device. A plurality of different sound information pieces are stored in association with three or more predetermined directions, respectively, a current position of the moving target device is identified, and then a moving direction of the device is identified. A sound obtained by combining two sounds in a ratio according to the identified moving direction is outputted on the basis of sound information pieces associated respectively with two adjacent directions sandwiching the identified moving direction among the predetermined directions.

18 Claims, 9 Drawing Sheets

(56) References Cited

U.S. PATENT DOCUMENTS

| | | | |
|---|---|---|---|
| 7,267,281 B2* | 9/2007 | Hopkins | 235/462.45 |
| 7,446,669 B2* | 11/2008 | Liebermann | 340/4.1 |
| 7,620,493 B2 | 11/2009 | Stankiewicz et al. | |
| 2006/0129308 A1* | 6/2006 | Kates | 701/200 |
| 2007/0016425 A1* | 1/2007 | Ward | 704/271 |
| 2007/0088498 A1* | 4/2007 | Pazos et al. | 701/207 |
| 2007/0221731 A1* | 9/2007 | Ricci | 235/462.01 |
| 2008/0040951 A1* | 2/2008 | Kates | 36/136 |
| 2008/0170118 A1* | 7/2008 | Albertson et al. | 348/46 |
| 2008/0309913 A1* | 12/2008 | Fallon | 356/4.01 |
| 2009/0076723 A1* | 3/2009 | Moloney | 701/209 |
| 2009/0122648 A1* | 5/2009 | Mountain et al. | 367/93 |
| 2011/0092249 A1* | 4/2011 | Evanitsky | 455/556.1 |
| 2012/0268563 A1* | 10/2012 | Chou et al. | 348/46 |

OTHER PUBLICATIONS

S. Brewster., "Visualization Tools for Blind People Using Multiple Modalities", Disability and Rehabilitation, vol. 24, No. 11/12, pp. 613-621 Jul. 2002.

Lorna M. Brown et al., "Design Guidelines for Audio Presentation of Graphs and Tables", Proceedings of the 2003 International Conference on Auditory Display, Boston, MA, USA, Jul. 6-9, 2003.

Jude Garvey, "Prototype system enables the visually impaired to 'see' the world with sound" Gizmag, Jul. 8, 2009. Internet: http://www.gizmag.com/visually-impaired-see-the-world-sound/12164/ (Accessed Oct. 25, 2011).

Jack M. Looms et al., "GPS-Based Navigation Systems for the Visually Impaired",Fundamentals of wearable computers and augmented reality, (pp. 429-446). Mahwah, NJ, US: Lawrence Erlbaum Associates Publishers, xv, 797 pp. 2001.

Tooba Nasir et al., "Sonification of Spatial Data", Proceedings of the 13th International Conference on Auditory Display, Montr'eal, Canada. Jun. 26-29, 2007 Internet: http://citeseerx.ist.psu.edu/viewdoc/download?doi=10.1.1.94&rep=rep1&type=pdf(Retrieved: Aug. 2010).

Peter Parente et al., "BATS: The Blind Audio Tactile Mapping System", Proceedings of ACM South Eastern Conference (2003).

* cited by examiner

 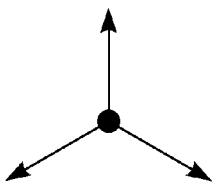 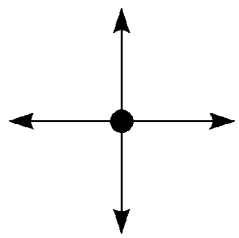 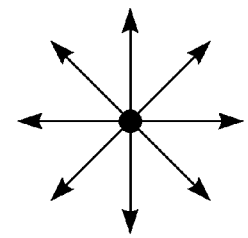
FIG. 3A     FIG. 3B     FIG. 3C     FIG. 3D
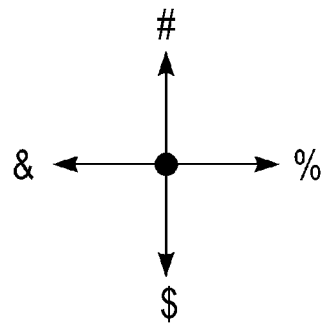
```
# : Flute      # : "E"
% : Violin     % : "A"
$ : Oboe       $ : "U"
& : Cello      & : "I"
```
FIG. 4A     FIG. 4B     FIG. 4C
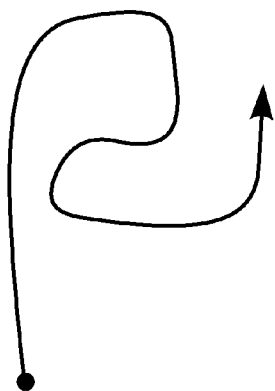
"######%%%$$$&&&$%%%##"
FIG. 5A     FIG. 5B

METHOD, DEVICE AND COMPUTER PROGRAM FOR MAPPING MOVING DIRECTION BY SOUNDS

CROSS-REFERENCE TO RELATED APPLICATION

This application claims priority under 35 U.S.C. §119 from Japanese Patent Application No. 2010-265981 filed Nov. 30, 2010, the entire contents of which are incorporated herein by reference.

BACKGROUND OF THE INVENTION

1. Field of the Invention

The present invention relates to a method, a device and a computer program for mapping a moving direction by using sounds.

2. Description of Related Art

In recent years, numerous systems have been developed for assisting people with visual impairments to engage in activities and process information in ways comparable to those without visual impairments. For example, there are systems capable of estimating the direction in which a person with a visual impairment is moving, on the basis of information which the person with the visual impairment acquires by use of a sense other than sight, e.g. a sense of hearing, smelling, touch or the like.

A number of techniques have already been disclosed for techniques of indicating a traveling direction, navigational techniques and the like. For example, the navigation apparatus shown in U.S. Pat. No. 7,620,493 generates a movement instruction regarding a distance and a direction to move from a current position to a target position, on the basis of information on the surrounding environment, e.g. information acquired by use of the sense of hearing, smelling, touch or the like.

Moreover, techniques for identifying a direction and a distance by using sounds have also been proposed. For example, in Tooba Nasir, Jonathan C. Roberts, "Sonification of spatial data", the 13th International Conference on Auditory Display, Montreal (Canada), Jun. 26-29, 2007, accurate positional information can be informed even to a person with visual impairment by use of stereo effects using two or more sound sources. The use of sounds is considered especially effective in guiding a person with visual impairment towards a dynamically changing direction.

Even though guiding a person with visual impairment by using sound is effective, the conventional techniques can express directions only one-dimensionally, thus, having difficulty in producing sound indicating a desired direction. For example, in the case of providing movement instructions by uttering meaningful words, the words each indicating a one-dimensional direction are repeated intermittently. Specifically, to provide an instruction to move forward to the right at a 45-degree angle, the words of "right" and "forward" are repeated as "right, forward, right, forward . . . . " Accordingly, it is too complicated to provide an instruction of a detailed direction, and is too difficult for people with visual impairments to correctly catch a movement instruction if the instruction is overlapped with another sound.

Although accurate positional information can be informed by using stereo effects, this technique requires a large-scale system with the necessity of preparing two or more sound sources, and hence has a problem that it is difficult to reduce the total cost for system construction.

SUMMARY OF THE INVENTION

The present invention has been made in view of the above-described circumstances, and aims to provide a method, a device and a computer readable storage medium for mapping a moving direction by using sounds, with which a moving direction can be expressed multi-dimensionally, especially two-dimensionally, by using sound information, and can effectively assist people with visual impairments and the like in navigation tasks.

To achieve the above object, the first aspect of the present invention provides a method for mapping a moving direction of a moving target by outputting a plurality of sounds from a sound output device in combination. The method includes storing a plurality of different sound information pieces in association with three or more predetermined directions, respectively, identifying the current position of the moving target; identifying the moving direction of the moving target, and outputting a sound obtained by combining two sounds in a ratio according to the identified moving direction, on the basis of sound information pieces associated respectively with two adjacent directions sandwiching the identified moving direction among the predetermined directions.

In another aspect of the present invention, a device for mapping a moving direction of a moving target by outputting a plurality of sounds in combination is provided. The device includes a sound information storing unit configured to store a plurality of different sound information pieces in association with three or more predetermined directions, respectively, a current-position identifying unit configured to identify the current position of the moving target, a moving-direction identifying unit configured to identify the moving direction of the moving target, and a sound output unit configured to output a sound obtained by combining two sounds in a ratio according to the identified moving direction, on the basis of sound information pieces associated respectively with two adjacent directions sandwiching the identified moving direction among the predetermined directions.

In yet another aspect of the present invention, a computer readable storage medium for mapping a moving direction of a moving target by outputting a plurality of sounds in combination is provided. The computer readable storage medium carries out the steps of a method comprising storing a plurality of different sound information pieces in association with three or more predetermined directions, respectively, identifying the current position of the moving target, identifying the moving direction of the moving target, and outputting a sound obtained by combining two sounds in a ratio according to the identified moving direction, on the basis of sound information pieces associated respectively with two adjacent directions sandwiching the identified moving direction among the predetermined directions.

According to the present invention, a moving direction of a moving target, e.g. a device main body, an imaginary object on a screen or the like, can be expressed multi-dimensionally, especially two-dimensionally, by using sounds, and a change of the moving direction can be expressed by changing sounds outputted successively. Even when information on a moving direction is overlapped with other audio information, the user can identify the moving direction while understanding the contents of the audio information. Further, since preparation of multiple sound sources is not required, guiding, for example, a person with visual impairment properly to a direction in which the person is to move, is enabled at a low cost.

BRIEF DESCRIPTION OF THE DRAWINGS

FIGS. 3A to 3D are views each showing an example of directions which are associated respectively with sound information pieces.

FIGS. 4A to 4C are views showing examples of sound information pieces stored in a storage of the information processor according to the embodiment of the present invention.

FIGS. 5A and 5B are views showing sound information pieces outputted for a given path.

DETAILED DESCRIPTION OF THE PREFERRED EMBODIMENTS

Figure 1:
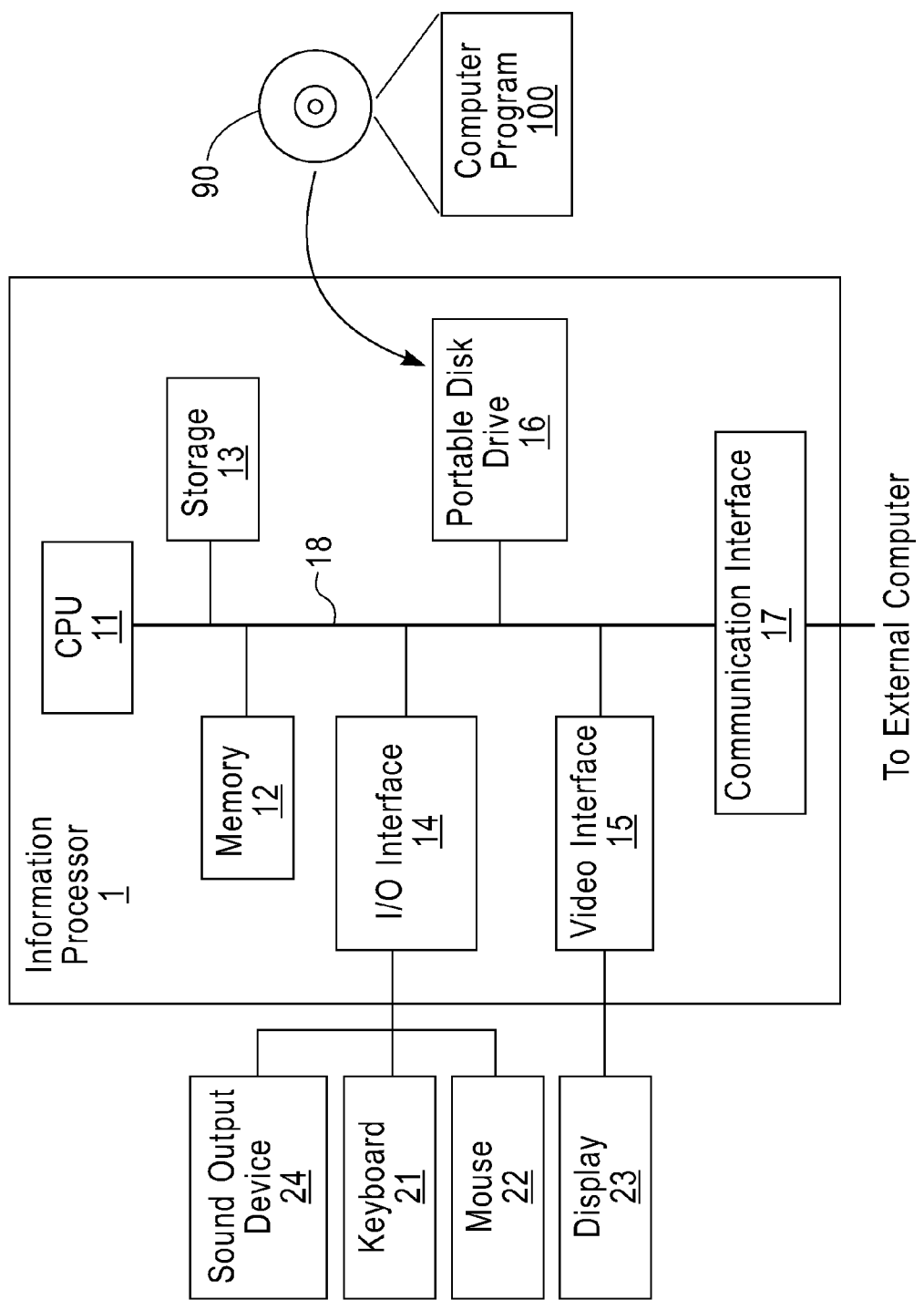
FIG. 1 is a block diagram schematically showing a configuration of information processor according to an embodiment of the present invention.

Detailed descriptions will be given below of a device according to an embodiment of the present invention for mapping a moving direction of a moving target by outputting multiple sounds in combination, on the basis of the accompanying drawings. Naturally, the embodiment to be given below is not to limit the invention described in the scope of claims, and not all the combinations of the characteristic features described in the embodiment are essential for solving means.

In addition, the present invention can be carried out by a number of different embodiments, and should therefore not be understood as is limited to what is described in the embodiment. Throughout the embodiment, the same components bear the same reference numerals.

In the following embodiment, descriptions will be given of a device in which a computer program is installed in a computer system. However, as is apparent to those skilled in the art, the present invention can be carried out as a computer program part of which can be executed by a computer. Accordingly, the present invention can be carried out in an embodiment as hardware serving as a device, an embodiment as software and an embodiment in combination of software and hardware, for mapping a moving direction of a moving target by outputting multiple sounds in combination. The computer program can be recorded in any computer-readable recording medium such as a hard disk, a DVD, a CD, an optical storage, a magnetic storage or the like.

According to the embodiment of the present invention, a moving direction can be expressed two-dimensionally by using sounds, and a change of the moving direction can be expressed by changing sounds outputted successively. Moreover, even when information on a moving direction is combined with different audio information, the moving subject can identify the moving direction while understanding the contents of the audio information. Further, since preparation of multiple sound sources is not required, guiding, for example, a person with a visual impairment properly to a direction in which the person is to move, is enabled at a low cost.

FIG. 1 is a block diagram schematically showing a configuration of an information processor according to an embodiment of the present invention. An information processor 1 according to the embodiment of the present invention includes at least a central processing unit (CPU) 11, a memory 12, storage 13, an I/O interface 14, a video interface 15, a portable disk drive 16, a communication interface 17 and an internal bus 18 connecting the above-described hardware units with each other.

The CPU 11 is connected to the above-described hardware units of the information processor 1 via the internal bus 18, and is configured to control operations of the above-described hardware units while performing various software functions in accordance with a computer program 100 stored in the storage 13. A volatile memory such as an SRAM, an SDRAM or the like, is used as the memory 12, and a load module is loaded into the memory 12 in executing the computer program 100. The memory 12 is configured to store temporary data and the like generated in executing the compute program 100.

A built-in stationary storage (hard disk), a ROM or the like is used as the storage 13. The computer program 100 stored in the storage 13 is downloaded from a portable recording medium 90, such as a DVD, a CD-ROM or the like, in which a program, data and the like are recorded, by the portable disk drive 16, and is loaded from the storage 13 into the memory 12 to be executed. Naturally, a computer program downloaded from an external computer connected to the hardware units via the communication interface 17 can be used, instead.

The communication interface 17 is connected to the internal bus 18, and is capable of exchanging data with an external computer and the like by being connected to an external network such as the Internet, a LAN, a WAN or the like.

The I/O interface 14 is connected to input devices such as a keyboard 21, a mouse 22 and the like, and is configured to receive data inputs. Moreover, the I/O interface 14 is also connected to an audio output device 24 such as a speaker or the like, and is configured to output desired sounds on the basis of an instruction by the CPU 11. The video interface 15 is connected to a display 23 such as a CRT display, a liquid-crystal display or the like, and is configured to display desired images.

Figure 2:
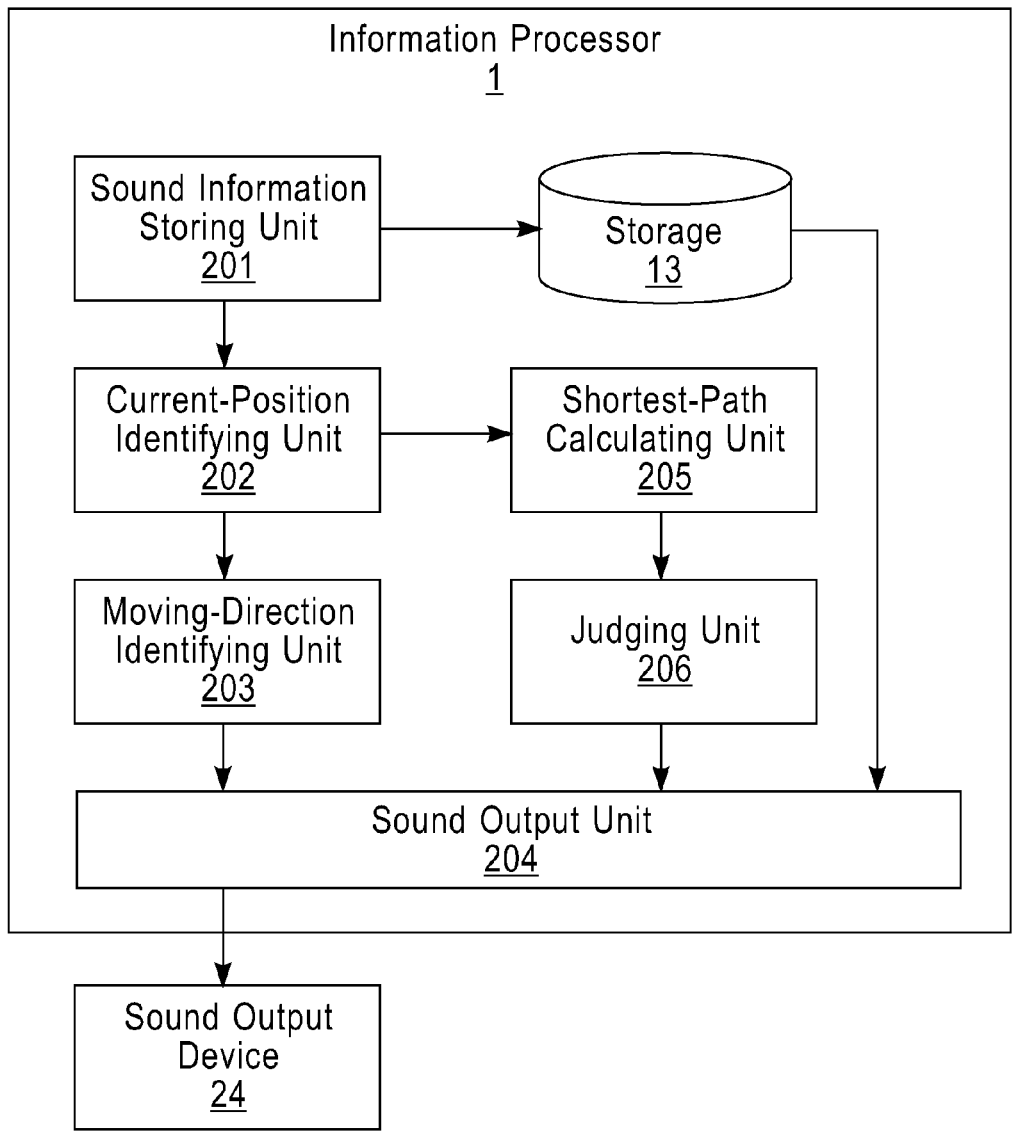
FIG. 2 is a functional block diagram of the information processor according to the embodiment of the present invention.

FIG. 2 is a functional block diagram of the information processor 1 according to the embodiment of the present invention. In FIG. 2, a sound information storing unit 201 of the information processor 1 stores multiple different sound information pieces in the storage 13 in association with three or more predetermined directions, respectively.

Here, the number of the predetermined directions is defined as three or more, and this enables two-dimensional expression of a moving direction. Specifically, in the case where only two different sound information pieces are stored in association with two predetermined directions, respectively, a person hearing an outputted sound encounters a difficulty in accurately identifying whether the sound indicates a forward direction, a backward direction, a rightward direction or a leftward direction, and requires assistance of different information, e.g. a word having a meaning or the like.

In the case where multiple different sound information pieces are stored in association with three or more predetermined directions, respectively, on the other hand, a person can uniquely determine the direction to move on the basis of the combination of outputted sounds. FIGS. 3A to 3D are views each showing an example of predetermined directions stored in association with sound information pieces, respectively. In FIGS. 3A to 3D, the mark ● indicates the current position of a moving subject. Here, the term "moving subject" means a person who moves while holding a sound output device (the information processor 1).

As shown in FIG. 3A, when sound information pieces are stored in association with two directions, respectively, a person can be able to determine whether the moving direction is forward or backward, but cannot determine rightward or leftward. Naturally, if each of the arrows is turned 90°, the person can determine whether the moving direction is right ward or leftward, but then cannot determine forward or backward. Thus, it is not possible to uniquely determine the moving direction by using sound information pieces for two directions only.

When sound information pieces are stored in association with three directions, respectively, as shown in FIG. 3B, a person can determine whether the moving direction is forward or backward and also can determine whether the moving direction is rightward or leftward. In this case, the person can determine the moving direction only by recognizing a sound information piece or a combination of sound information pieces.

Generally, to facilitate a person to determine the direction to move, four directions as shown in FIG. 3C or eight directions as shown in FIG. 3D are used desirably. The four or eight directions are considered to agree with the sense of directions in an everyday life and thus to allow quick determination.

FIGS. 4A to 4C show examples of sound information pieces stored in the storage 13 of the information processor 1 according to the embodiment of the present invention. As shown in FIG. 4A, sound information pieces are stored in association with four directions, i.e. a forward direction, a rightward direction, a backward direction and a leftward direction, respectively.

For example, in FIG. 4B, as the sound information pieces, instrument sounds are stored in association with the four directions, respectively. In the example of FIG. 4B, the sound of "flute", the sound of "violin", the sound of "oboe" and the sound of "cello" are stored in association with the forward direction (#), the rightward direction (%), the backward direction ($) and the leftward direction (&), respectively. A direction between two of the above directions, e.g. the forward right direction, is expressed by outputting a sound obtained by combining the sound for the forward direction and the sound for the rightward direction in the ratio of 1:1. Specifically, when the sound obtained by combining the sound of "flute" and the sound of "violin" in the ratio of 1:1 is outputted, the moving subject can recognize that he/she is to move in the forward right direction.

Similarly, in FIG. 4C, as sound information pieces, voices respectively pronouncing vowels are stored in association with the four directions, respectively. In the example of FIG. 4C, the voice of "e", the voice of "a", the voice of "u" and the voice of "i" are stored in association with the forward direction (#), the rightward direction (%), the backward direction ($) and the leftward direction (&), respectively. A direction between two of the above directions, e.g. the frontward right direction, is expressed by outputting a voice obtained by combining the voice for the forward direction and the voice for the rightward direction in the ratio of 1:1. Specifically, when the voice obtained by combining the voice of "e" and the voice of "a" in the ratio of 1:1, i.e., a voice pronouncing a sound between "a" and "e", is outputted, the person can recognize that he/she is to move in the forward right direction.

In the case of using voices respectively pronouncing vowels, the vowel outputted by combining voices pronouncing two vowels is often one the user is used to hearing in his/her everyday life. For this reason, in such a case, the user can easily differentiate between the voices and can quickly notice a change in successive sounds, compared with the case of using other types of sounds such as instrument sounds or the like.

FIGS. 5A and 5B are views showing an example of sound information pieces outputted for a given path. FIG. 5A shows a moving path, where the mark ● indicates the current position of the moving target, and the moving subject moves along the path in the direction indicated by the arrow.

FIG. 5B shows sound information pieces corresponding respectively to sounds to be outputted, by using a series of symbols respectively indicating directions. The moving subject moves in the forward direction for a while after starting from the mark ●, and this movement is expressed by showing a series of the symbols "#" indicating the forward direction. This means that the sound corresponding to the sound information piece stored in association with the forward direction (#) is outputted successively.

Then, similarly, sounds corresponding to the sound information pieces stored in association with moving directions, i.e. the rightward direction (%), the backward direction ($), the leftward direction (&), the backward direction ($), the rightward direction (%) and then the forward direction (#), are outputted sequentially.

Returning to FIG. 2, a current-position identifying unit 202 identifies a current position of the moving target, e.g. the information processor 1. The identified current position can be an absolute position such as coordinate values based on a GPS or the like, or can be a relative position showing a relative displacement from a predetermined reference point.

A moving-direction identifying unit 203 identifies a moving direction from the current position identified by the current-position identifying unit 202 to a next target point to move to. The next target point to move to is identified according to a moving speed. Hence, the moving direction is changed as needed.

A sound output device 204 extracts sound information pieces stored respectively in association with two adjacent directions sandwiching the identified moving direction, among the forward direction (#), the rightward direction (%), the backward direction ($) and the leftward direction (&), and then outputs the two sounds combined in a ratio according to the moving direction on the basis of the extracted sound information pieces. For example, when the moving direction is the forward right direction, the sound output device 204 outputs sounds corresponding to the sound information pieces stored respectively in association with the forward direction (#) and the rightward direction (%), the sounds being combined in the ratio based on the proportional distribution of the two adjacent directions sandwiching the moving direction.

Figure 6:
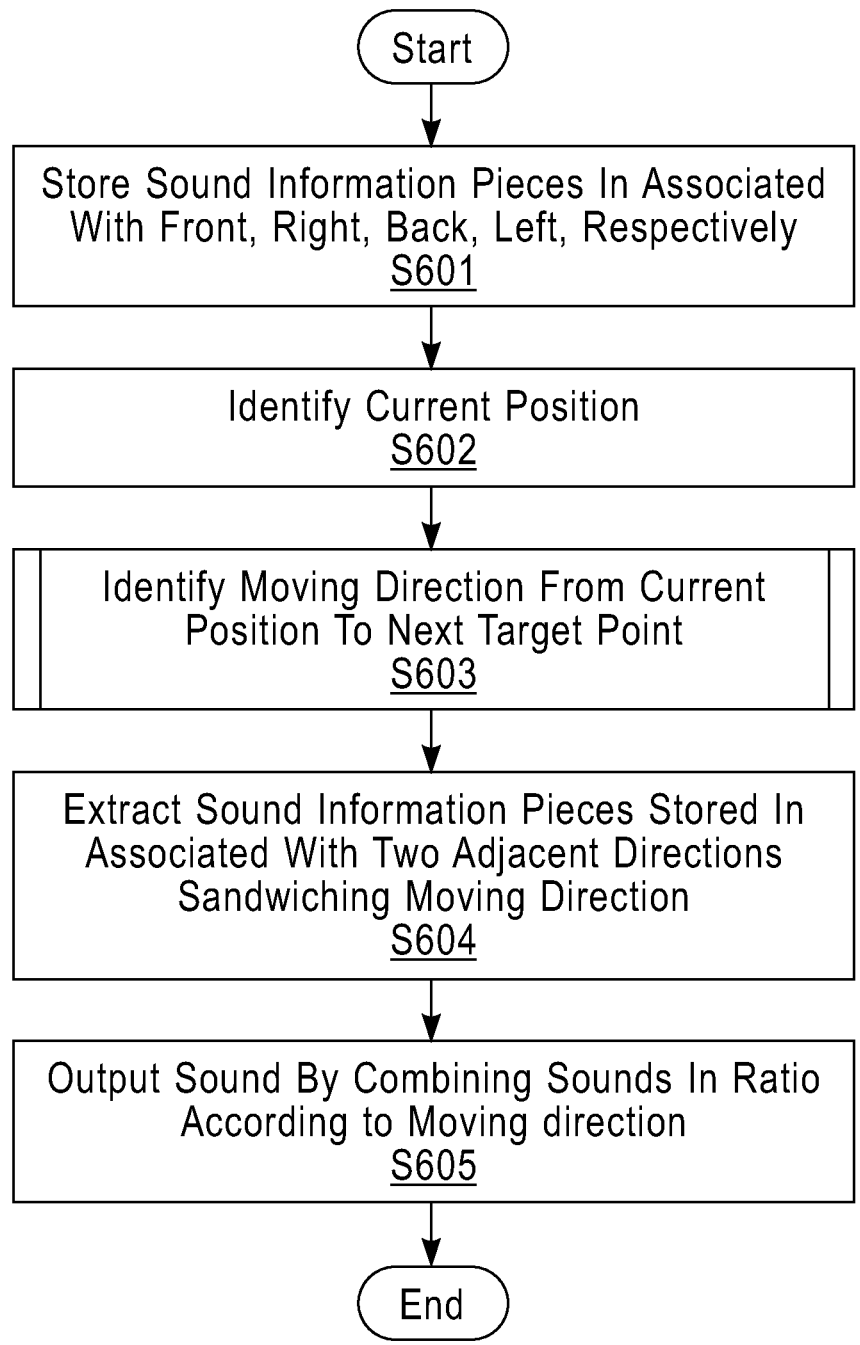
FIG. 6 is a flowchart showing a procedure of processing performed by a CPU of the information processor according to the embodiment of the present invention.

FIG. 6 is a flowchart showing a procedure of processing performed by the CPU 11 of the information processor 1 according to the embodiment of the present invention. In FIG. 6, the CPU 11 of the information processor 1 stores, in the storage 13, multiple different sound information pieces in association with three or more predetermined directions (Step S601).

The CPU 11 identifies a current position of a moving target, e.g. the information processor 1 (Step S602). The identified current position can be an absolute position such as coordinate values based on a GPS or the like, or can be a relative position showing a relative displacement from a predetermined reference point.

The CPU 11 identifies a moving direction from the identified current position to a next target point to move to (Step S603). The next target point to move to is identified according to a moving speed. Hence, the moving direction is changed as needed along a predetermined path.

The CPU 11 extracts sound information pieces stored respectively in association with two adjacent directions sandwiching the identified moving direction, among the forward direction (#), the rightward direction (%), the backward direction ($) and the leftward direction (&) (Step S604), and then outputs the two sounds combined in a ratio according to the moving direction on the basis of the extracted sound information pieces (Step S605).

Here, it is preferable that the moving-direction identifying unit 203 identify, as a moving direction, the direction from the current position identified by the current-position identifying unit 202 to the target point to move to according to a moving speed. This configuration makes it possible to change the moving direction as needed along the predetermined path. In this case, a distance from the current position to the target point needs to be larger as the moving speed becomes faster, since the moving amount per unit time is larger.

Figure 7:
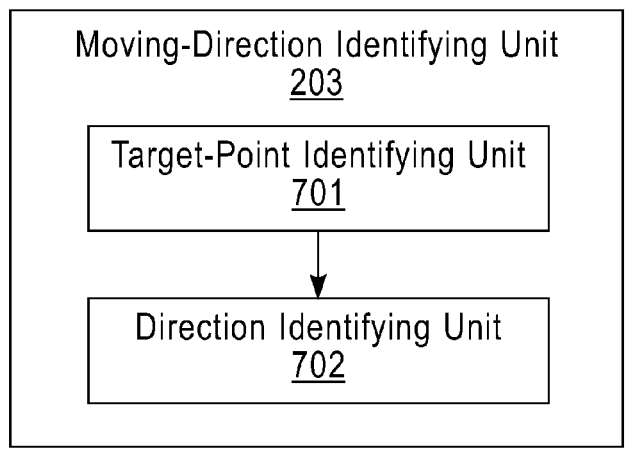
FIG. 7 is a functional block diagram showing a configuration of a moving-direction identifying unit according to the embodiment of the present invention.

FIG. 7 is a functional block diagram showing a configuration of the moving-direction identifying unit 203 according to the embodiment of the present invention. In FIG. 7, a target-point identifying unit 701 identifies a target point to move to according to a moving speed.

Figures 8A, 8B:
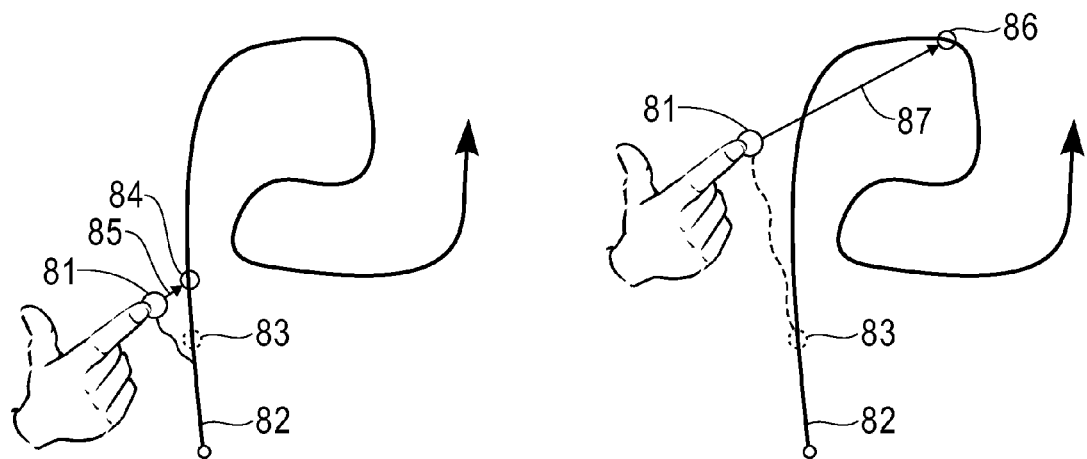
FIGS. 8A and 8B are views showing an example of a method for identifying a target point according to a moving speed.

FIGS. 8A and 8B are views showing an example of a method for identifying a target point according to a moving speed. FIG. 8A is an example of identifying a target point when the moving speed is slow. As shown in FIG. 8A, when the moving speed of a current position 81 of the moving target is slow, the moving amount (distance) of the current position 81 is small, and a target point 83 only moves to a target point 84. Accordingly, a direction 85 from the current position 81 to the target point 84 is identified as a moving direction.

FIG. 8B is an example of identifying a target point when the moving speed is fast. As shown in FIG. 8B, when the moving speed of the current position 81 of the moving target is fast, the moving amount (distance) of the current position 81 is large, and hence the target point 83 moves a longer distance to a target point 86. Accordingly, a direction 87 from the current position 81 to the target point 86 is identified as a moving direction.

Returning to FIG. 7, a direction identifying unit (identifying unit) 702 identifies the direction from the current position to a target point as a moving direction. With this configuration, the moving subject is instructed to move relatively quickly in a linear path while moving relatively slowly in a path including many curves, and can thereby move without diverging a lot from the predetermined path.

Figure 9:
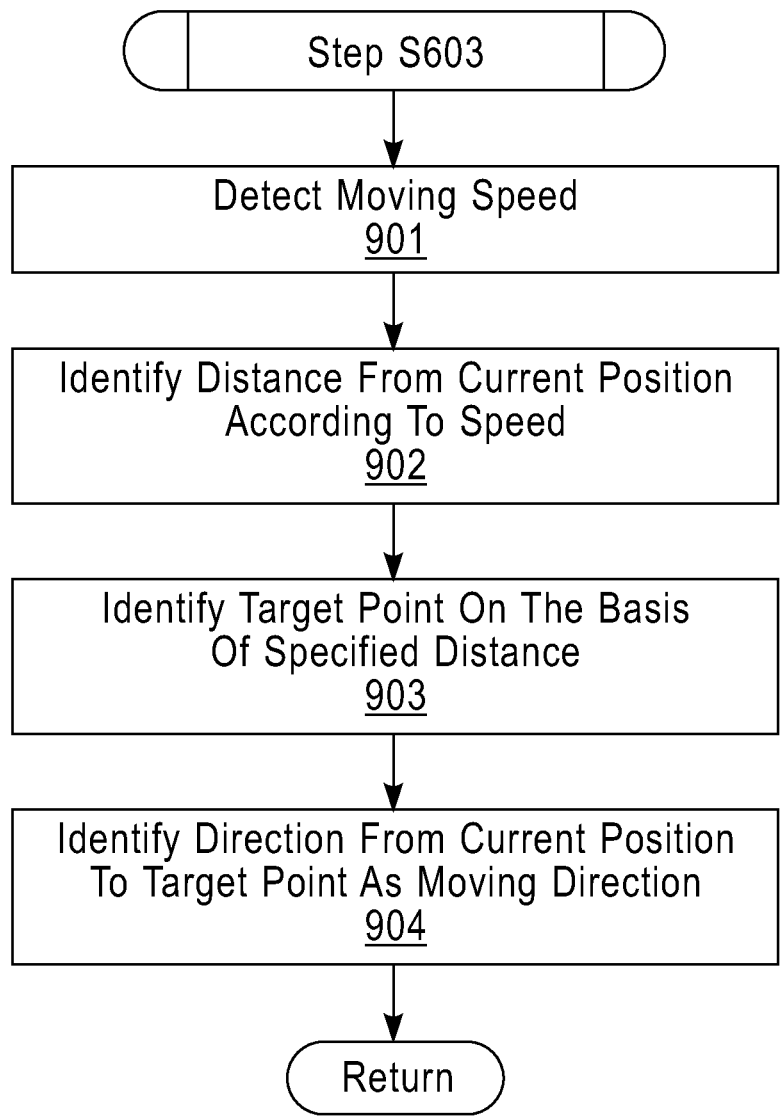
FIG. 9 is a flowchart showing a procedure of processing for identifying a moving direction performed by the CPU of the information processor according to the embodiment of the present invention.

FIG. 9 is a flowchart showing a procedure of processing for identifying a moving direction performed by the CPU 11 of the information processor 1 according to the embodiment of the present invention. In FIG. 9, the CPU 11 of the information processor 1 detects a moving speed (Step S901), and identifies a distance from the current position of the moving target to a target point according to the detected speed (Step S902), in Step S603 in FIG. 6. The CPU 11 identifies the target point in a predetermined path on the basis of the identified distance (Step S903). Then, the CPU 11 returns the processing to Step S604 in FIG. 6, and repeats the above-described processing.

Here, it is preferable that colored noise be outputted as warning if a current position of the moving target deviates a lot from the predetermined path. To enable this, a shortest-path calculation unit 205 shown in FIG. 2 calculates a shortest path from the current position of the moving target to the predetermined path every time the moving target moves a certain distance in order to move along the predetermined path. A judging unit 206 judges whether or not the length of the calculated shortest path is above a predetermined value. When the judging unit 206 judges that the length is above the predetermined value, the sound output unit 204 outputs colored noise.

Figure 10:
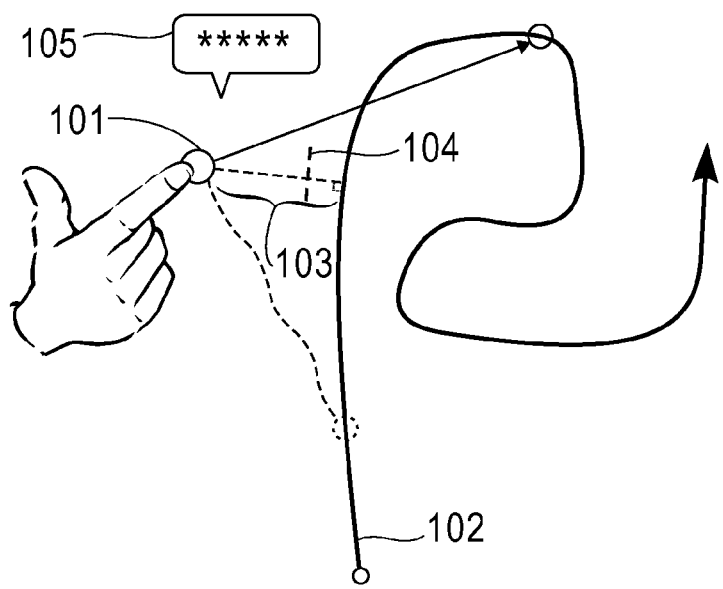
FIG. 10 is a view showing an example of an overview of processing performed in the case of outputting colored noise.

FIG. 10 is a view showing an example of an overview of processing performed in the case of outputting colored noise. In FIG. 10, to see how much a current position 101 is deviating from a predetermined path 102, the normal line to the predetermined path 102 is drawn from the current position 101 of the moving target, and a linear distance 103 is calculated. If the value of the linear distance 103 is above a predetermined value 104 of the distance from the predetermined path 102, it is judged that the current position 101 is deviating a lot, and hence colored noise 105 is outputted.

Figure 11:
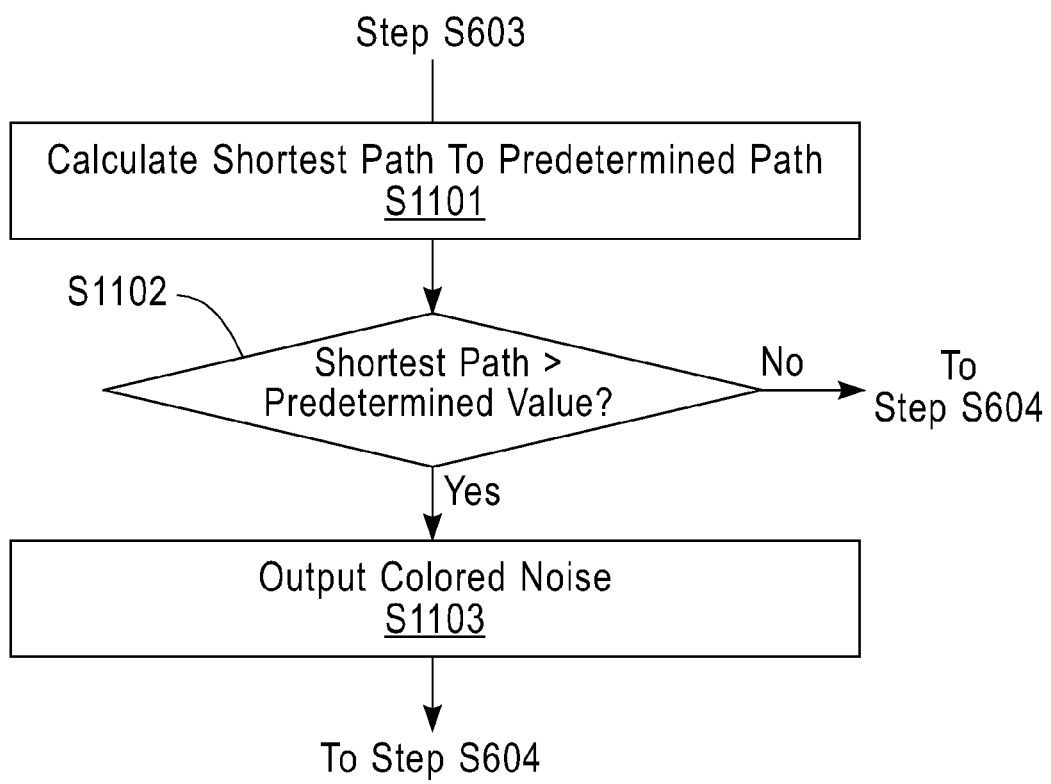
FIG. 11 is a flowchart showing a procedure of processing for outputting the colored noise performed by the CPU of the information processor according to the embodiment of the present invention.

FIG. 11 is a flowchart showing a procedure of processing for outputting colored noise performed by the CPU 11 of the information processor according to the embodiment of the present invention. In FIG. 11, after Step S603 in FIG. 6, the CPU 11 of the information processor 1 calculates a shortest path from a current position of the moving target to the predetermined path (Step S1101), and then judges whether or not the length of the shortest path is above the predetermined value (Step S1102).

When judging that the length is equal to or below the predetermined value (Step S1102: NO), the CPU 11 advances the processing to Step S604 in FIG. 6. When judging that the length is above the predetermined value (Step S1102: YES), the CPU 11 outputs colored noise (Step S1103), and advances the processing to Step S604 in FIG. 6.

The sound outputted from the sound output unit 204 is not limited to a fixed sound. If there are various spots in a path, the sound output unit 204 can output a sound corresponding to the characteristics of each spot.

Figure 12A:
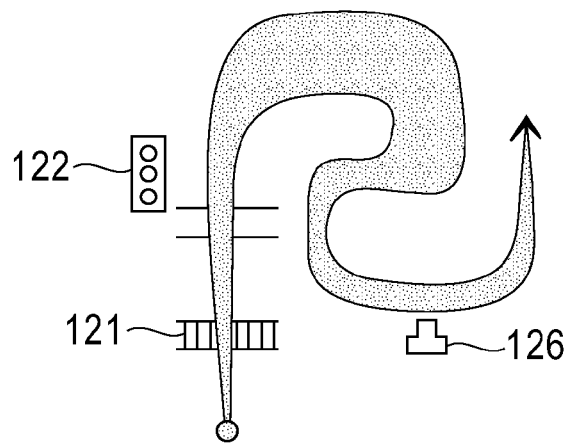
FIGS. 12A and 12B are views showing an example of a case in which a sound to be outputted is changed for each spot located in a path.
Figure 12B:
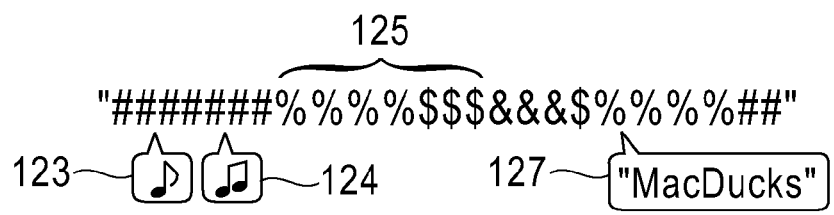

FIGS. 12A and 12B are views showing an example in which different sounds are outputted depending on the characteristics of the spots located in the path. FIGS. 12A and 12B are basically the same as FIGS. 5A and 5B. What is different is that, in the case of FIGS. 12A and 12B, there are a railroad crossing 121, traffic lights 122 and a store 126 in the path and the width of the path varies.

FIG. 12A shows a moving path where the mark ● shows a current position of the moving target, and the moving subject moves along the path in the direction indicated by the allow. FIG. 12B shows sound information pieces corresponding respectively to the sounds to be outputted, by a series of symbols each indicating a direction. The existences of the railroad crossing 121, the traffic lights 122 and the like are informed by a sound not existing in the real world, e.g. "beep" or the like, outputted by so-called earcons 123 and 124 shown in FIG. 12B, respectively. The existence of the store 126 can be informed by a store name or the like pronounced by a synthetic voice outputted by a so-called spearcon 127 shown in FIG. 12B.

Additionally, in FIG. 12B, the change of the pitch, volume or the like of the sounds for a section 125 is expressed by showing the symbols in bold. Specifically, the variation of the width of the path can be informed by the change of the pitch, volume or the like of the sounds as shown in the section 125.

As described above, according to the embodiment of the present invention, a moving direction of a moving target can be expressed two-dimensionally by using sounds, and a change of the moving direction can be expressed by changing sounds outputted successively. Moreover, even when information on a moving direction is overlapped with other audio information, the moving subject can identify the moving direction while understanding the contents of the audio information. Further, since preparation of multiple sound sources is not required, guiding, for example, a person with a visual impairment properly to a direction in which the person is to move, is enabled at a low cost.

Here, sounds can be outputted for the purpose of informing a person with a visual impairment of a predetermined path in advance, instead of guiding a person with a visual impairment to a direction to move. In this case, it is preferable that a start point and an end point of a predetermine path be identified, and that the person be informed of the path between the points by sounds indicating moving directions.

Figure 13:
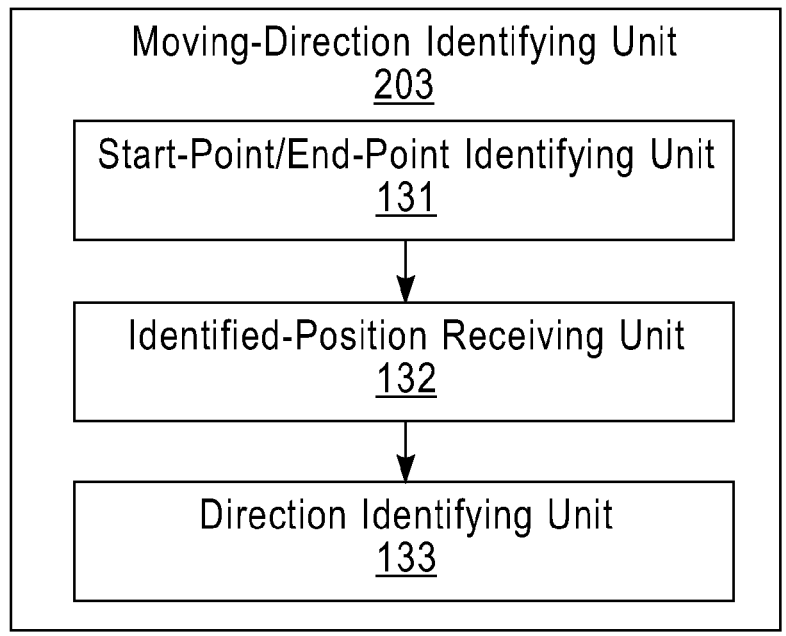
FIG. 13 is a functional block diagram showing a configuration of the moving-direction identifying unit according to the embodiment of the present invention for checking a path.

FIG. 13 is a functional block diagram showing a configuration of the moving-direction identifying unit 203 according to the embodiment of the present invention for checking a moving path. In FIG. 13, a start-point/end-point identifying unit 131 identifies a start point from which moving is to be started and an end point at which the moving is to be finished, in a predetermined path.

A position designation receiving unit 132 receives designation of a certain position located between the start point and the end point in the path. A direction identifying unit (identifying unit) 133 identifies a moving direction from the designated position. Specifically, the direction identifying unit 133 identifies a direction from the current position of the moving target to a target point as the moving direction. In this way, the moving subject can check the moving direction from any position in the path by listening to the sounds, and can hence certainly understand an approximate outline of the path.

Figure 14:
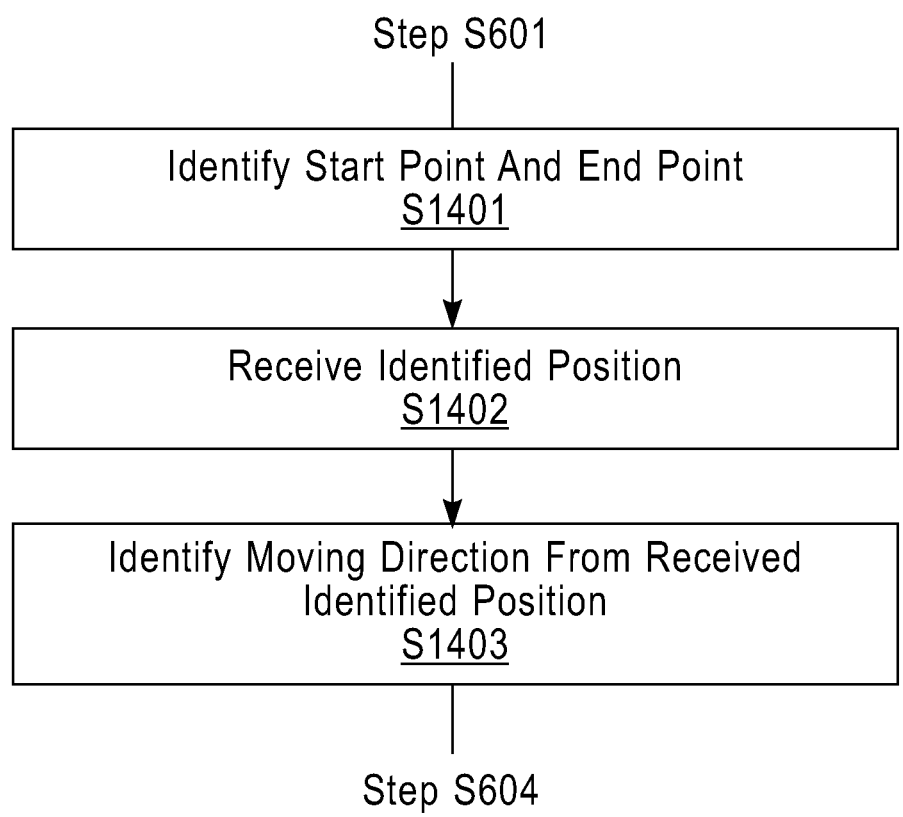
FIG. 14 is a flowchart showing a procedure of processing for checking a moving path performed by the CPU of the information processor according to the embodiment of the present invention.

FIG. 14 is a flowchart showing a procedure of processing for checking a moving path performed by the CPU 11 of the information processor 1 according to the embodiment of the present invention. In FIG. 14, after Step S601 in FIG. 6, the CPU 11 of the information processor 1 identifies the start point and the end point of a predetermined path (Step S1401), and then receives designation of a certain position in the path (Step S1402). A method for receiving designation of a certain position is not limited to any particular method, and can be any method as long as designation of a certain position in the path can be received by using a slider or the like.

The CPU 11 identifies a moving direction from the received designated position (Step S1403), and advances the processing to Step S604 in FIG. 6. In this way, the moving subject can check the moving direction from a certain position by listening to the sounds, and can easily understand an approximate outline of the path.

It is to be noted that the present invention is not limited to the above-described embodiment, and various alternations, improvements and the like are possible within the scope of the spirit of the present invention. For example, a moving target can be an imaginary object displayed on a screen. In this case, sounds indicating a moving direction can be outputted with respect to a position of a finger on a touch panel, for example.

The invention claimed is:

1. A method for mapping a moving direction of a moving target to assist a person having a visual impairment by outputting a plurality of sounds from a sound output device in combination, the method comprising:
   storing a plurality of different non-verbal sound information pieces to represent at least three predetermined directions, respectively;
   identifying a current position of the moving target;
   identifying a moving direction of the moving target; and
   outputting a sound obtained by combining two sounds in a ratio according to the identified moving direction, using sound information pieces associated respectively with two adjacent directions sandwiching the identified moving direction among the predetermined directions, wherein the sounds are combined in a ratio based on the proportional distribution of the two adjacent directions.

2. The method according to claim 1, wherein the predetermined directions are four directions which are front, right, back and left, and sounds corresponding respectively to the sound information pieces associated respectively with the two adjacent directions sandwiching the moving direction are outputted, being combined in the ratio according to the moving direction.

3. The method according to claim 1, wherein a sound corresponding to each of the sound information pieces is a voice pronouncing a vowel.

4. The method according to claim 1, comprising:
   calculating a shortest path from the current position of the moving target to a predetermined path every time the moving target moves a certain distance in an attempt to move along the predetermined path;
   judging whether or not a length of the calculated shortest path is above a predetermined value; and
   outputting colored noise when it is judged that the length is above the predetermined value.

5. The method according to claim 1, wherein the identifying a moving direction of the moving target includes:
   identifying a target point where the moving target is to move, according to a moving speed of the moving target; and
   identifying a direction from the current position to the target point as the moving direction, wherein a distance from the current position to the target point is set larger as the moving speed becomes faster.

6. The method according to claim 1, wherein the identifying the moving direction of the moving target includes:
   identifying a moving start point and a moving end point in a predetermined path;
   receiving designation of a certain designated position located between the moving start point and the moving end point; and
   identifying the moving direction of the moving target from the received designated position.

7. A device for mapping a moving direction of a moving target to assist a person having a visual impairment by outputting a plurality of sounds in combination, the device comprising:
- a sound information storing unit configured to store a plurality of different non-verbal sound information pieces to represent at least three predetermined directions, respectively;
- a current-position identifying unit configured to identify a current position of the moving target;
- a moving-direction identifying unit configured to identify a moving direction of the moving target; and
- a sound output unit configured to output a sound obtained by combining two sounds in a ratio according to the identified moving direction, using sound information pieces associated respectively with two adjacent directions sandwiching the identified moving direction among the predetermined directions, wherein the sounds are combined in a ratio based on the proportional distribution of the two adjacent directions.

8. The device according to claim 7, wherein
the predetermined directions are four directions which are front, right, back and left, and
the sound output unit is configured to output sounds corresponding respectively to the sound information pieces associated respectively with the two adjacent directions sandwiching the moving direction, with the sounds combined in the ratio according to the moving direction.

9. The device according to claim 7, wherein a sound corresponding to each of the sound information pieces is a voice pronouncing a vowel.

10. The device according to claim 7, comprising:
- a shortest-path calculating unit configured to calculate a shortest path from the current position of the moving target to a predetermined path every time the moving target moves a certain distance in an attempt to move along the predetermined path; and
- a judging unit configured to judge whether or not a length of the calculated shortest path is above a predetermined value, wherein
the sound output unit outputs colored noise when the judging unit judges that the length is above the predetermined value.

11. The device according to claim 7, wherein the moving-direction identifying unit includes:
- a target-point identifying unit configured to identify a target point where the moving target is to move, according to a moving speed of the moving target; and
- an identifying unit configured to identify a direction from the current position to the target point as the moving direction, wherein a distance from the current position to the target point is set larger as the moving speed becomes faster.

12. The device according to claim 7, comprising:
- a start-point/end-point identifying unit configured to identify a moving start point and a moving end point in a predetermined path;
- a position designation receiving unit configured to receive designation of a certain designated position located between the moving start point and the moving end point; and
- an identifying unit configured to identify a moving direction of the moving target from the received designated position.

13. A computer readable storage medium tangibly embodying a computer readable program code having computer readable instructions which, when implemented, cause a computer to carry out method steps to assist a person having a visual impairment the method comprising:
- storing a plurality of different non-verbal sound information pieces to represent at least three predetermined directions, respectively;
- identifying a current position of the moving target;
- identifying a moving direction of the moving target; and
- outputting a sound obtained by combining two sounds in a ratio according to the identified moving direction, using sound information pieces associated respectively with two adjacent directions sandwiching the identified moving direction among the predetermined directions, wherein the sounds are combined in a ratio based on the proportional distribution of the two adjacent directions.

14. The computer readable storage medium according to claim 13, wherein the predetermined directions are four directions which are front, right, back and left, and sounds corresponding respectively to the sound information pieces associated respectively with the two adjacent directions sandwiching the moving direction are outputted, being combined in the ratio according to the moving direction.

15. The computer readable storage medium according to claim 13, wherein a sound corresponding to each of the sound information pieces is a voice pronouncing a vowel.

16. The computer readable storage medium according to claim 13, further comprising the steps of:
- calculating a shortest path from the current position of the moving target to a predetermined path every time the moving target moves a certain distance in an attempt to move along the predetermined path;
- judging whether or not a length of the calculated shortest path is above a predetermined value; and
- outputting colored noise when it is judged that the length is above the predetermined value.

17. The computer readable storage medium according to claim 13, wherein the identifying the moving direction of the moving target includes:
- identifying a target point where the moving target is to move, according to a moving speed of the moving target; and
- identifying a direction from the current position to the target point as the moving direction, wherein a distance from the current position to the target point is set larger as the moving speed becomes faster.

18. The computer readable storage medium according to claim 13, wherein the identifying the moving direction of the moving target includes:
- identifying a moving start point and a moving end point in a predetermined path;
- receiving designation of a certain designated position located between the moving start point and the moving end point; and
- identifying the moving direction of the moving target from the received designated position.

* * * * *